No. 627,962. Patented July 4, 1899.
W. B. ALLEN.
ROLLER BEARING.
(Application filed Nov. 26, 1897.)
(No Model.)
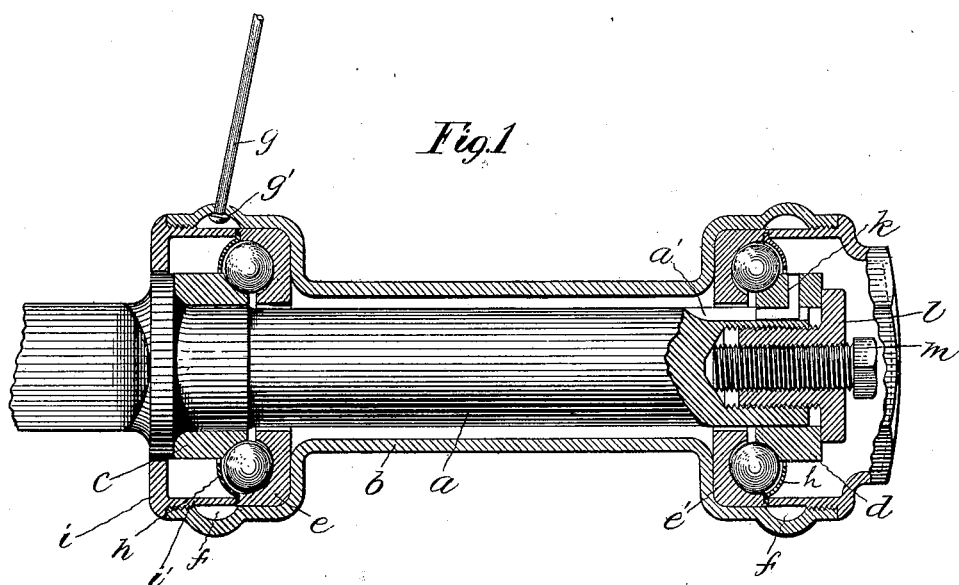
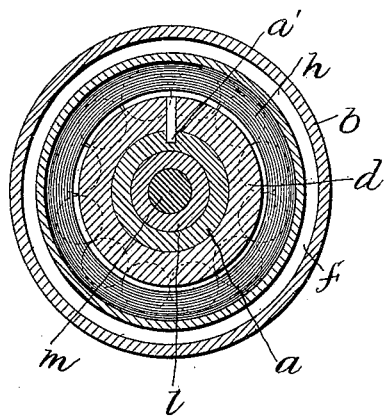
Witnesses:
William H. Barker,
Arthur B. Jenkins
Inventor:
William Bradford Allen,
by Chas. L. Burdett,
Attorney.
THE NORRIS PETERS CO., PHOTO-LITHO., WASHINGTON, D. C.

UNITED STATES PATENT OFFICE.

WILLIAM BRADFORD ALLEN, OF HARTFORD, CONNECTICUT, ASSIGNOR TO THE PREMIER MANUFACTURING COMPANY, OF SAME PLACE.

ROLLER-BEARING.

SPECIFICATION forming part of Letters Patent No. 627,962, dated July 4, 1899.

Application filed November 26, 1897. Serial No. 659,727. (No model.)

*To all whom it may concern:*

Be it known that I, WILLIAM BRADFORD ALLEN, a citizen of the United States, and a resident of Hartford, in the county of Hartford and State of Connecticut, have invented certain new and useful Improvements in Roller-Bearings, of which the following is a full, clear, and exact description, whereby any one skilled in the art can make and use the same.

My invention relates to wheels adapted more especially for use on light road-vehicles, as wagons, carts, and the like, although it may be equally applied to wheels of other vehicles; and the object of my invention is to provide a ball-bearing wheel simple of construction, durable, and with bearings well protected from dust, and having means for retaining the parts in any desired position of adjustment.

To this end my invention consists in the device as a whole and in details entering into the construction, as hereinafter described, and more particularly pointed out in the claims.

Referring to the drawings, Figure 1 is a view in central vertical section through a wheel, showing my improved construction with the axle-arm broken away. Fig. 2 is a detail view in cross-section through the device just in front of the cone-key.

My invention is illustrated and described herein in connection with the well-known type of suspension-wheel, although certain features of the construction are equally applicable to wheels of other types.

In the accompanying drawings the letter $a$ denotes an axle arm or support for a wheel or like part, and $b$ the hub of a wheel. At the inner end of the axle-arm a cone $c$ is supported, resting against a shoulder on the arm, and at the outer end of the arm a cone $d$ is supported. The ends of the hub $b$ are enlarged, and at the inner ends of the enlarged portions are located ball-cases $e\ e'$. Recesses $f$ are formed in the walls of the enlarged portions of the hub of the wheel, in which heads $g'$ of spokes $g$ are located. These recesses are preferably so formed that the spokes will project in a straight line from the head thereof to the rim of the wheel. Retaining-washers $h$ are attached to the ball-cases $e\ e'$, this washer holding the balls securely in place when the axle-wheel is removed from the hub, as for the purpose of lubricating or cleaning.

A dust-cap $i$ is secured to each end of the hub, as by means of interengaging screw-threads, a shoulder on the cap lying against the end of the hub and an inward-projecting flange $i'$ completely inclosing the recesses $f$ within the hub. By means of this construction the spokes may be readily inserted in the hub, the absence of any bend adding to the durability of the wheel as a whole, and the inclosing of the heads within the hub affords a sure means of protection from the breaking of the head and the consequent loosening of the spokes.

The cone $d$ is supported on the outer end of the axle-arm and is held against rotation by means of a cone-key $k$. This key is of angular shape, preferably L or T, one part being located in a key-slot $a'$ in the axle-arm and another part in a radial opening through the cone, which part may be riveted or headed into a countersunk recess in the cone. An adjusting-bolt $l$ fits a threaded opening in the end of the axle-arm and is used for the purpose of adjusting the ball-bearings, and a locking-bolt $m$ fits a threaded opening through the adjusting-bolt, the inner end of the locking-bolt thrusting against the bottom of the socket in the end of the axle. In a construction of parts in which a cone is accurately located with reference to the ball-case to secure the proper adjustment of the bearings by means of interengaging screw-threads there is a liability in the revolution of the balls in the ball-race and about the cone to rotate the cone, thus loosening or tightening the bearing of the cone against the balls. In the construction above described this fault is entirely obviated, the cone having no rotary movement whatever and being held in its position of adjustment by means of the adjusting-bolt $l$, and with the angular key having a part located in the groove in the axle the cone must always be inserted on the spindle in the same position and maintained in this position at all times.

An important feature of my invention resides in locating the cone-key so that it shall project to or beyond the surface of that side of the cone facing inward on the axle-arm, as clearly shown in Fig. 1 of the drawings—in this instance the face of the cone. This construction of parts insures the insertion of the key in the key-slot $a'$ in order to locate the cone on the axle-arm to any extent whatever. An objection has been found to a construction where the key is located within the central opening in the cone and at a distance from the end of said opening from the fact that the cone may be placed on the axle with the key lying against the end of the arm instead of in the key-slot. The bolt being now screwed to place with the parts in this position results in breaking or shearing off the key. By my improved construction such a result is prevented, no matter how careless or inexperienced the workman.

An L-shaped key has been shown and described herein as embodying the preferred form of the invention; but my invention is present in any form of device in which the key is so arranged that it must be located in the slot at the same time as or before the cone is placed on the axle to any extent whatever.

I claim as my invention—

1. In combination with a wheel or like part arranged for ball-bearings, an axle-arm and a cone supported thereon, one of said parts having a groove extending to the end thereof, and the opposite part having a radial opening, an angular-shaped key with one branch extending into said opening and the other branch adapted to enter said groove and with its end extending to the surface of that side of its supporting part first engaging with the opposite part, and means for holding the cone in position.

2. In combination with a wheel or like part arranged for ball-bearings, an axle-arm having a groove extending to the end thereof, a cone adapted to be supported by said axle-arm, an angular-shaped key having one branch extending into a radial opening in the cone and another branch adapted to enter the groove in the axle-arm and with its end extending to the surface of that side of the cone facing inward on the axle-arm, and means for holding the cone in position.

WILLIAM BRADFORD ALLEN.

Witnesses:
   ARTHUR B. JENKINS,
   GRACE E. METCALF.